United States Patent [19]

Luksch et al.

[11] Patent Number: 4,867,503
[45] Date of Patent: Sep. 19, 1989

[54] WIND DEFLECTOR FOR SLIDING ROOFS OF AUTOMOBILES

[75] Inventors: Kurt Luksch, Rüsselsheim; Albert Schlapp, Dreieich, both of Fed. Rep. of Germany

[73] Assignee: Rockwell-Golde GmbH, Fed. Rep. of Germany

[21] Appl. No.: 669,713

[22] Filed: Nov. 9, 1984

[30] Foreign Application Priority Data

Nov. 29, 1983 [DE] Fed. Rep. of Germany ... 334306162

[51] Int. Cl.⁴ .............................................. B60J 7/22
[52] U.S. Cl. .................................. 296/217; 296/180.1
[58] Field of Search ................... 296/15, 217, 91, 1 R; 98/2.12, 2.13, 2.14; 244/200

[56] References Cited

U.S. PATENT DOCUMENTS

| | | | |
|---|---|---|---|
| 1,903,823 | 4/1933 | Lougheed | 244/200 |
| 2,322,632 | 6/1943 | Harper Jr. | 244/200 |
| 4,447,086 | 5/1984 | Roos et al. | 296/217 |

*Primary Examiner*—Robert R. Song

[57] ABSTRACT

In a stationary or pivotal wind deflector for sliding roofs of automobiles, for the purpose of attaining effective air flow drag, a brush-like coating is provided on the surface of the wind deflector plate at least in the region of the rear edge fo the wind deflector plate. The brush-like coating, which can be applied by electrostatic fiber deposition, reduces wind noise and the air vibrations in the interior of the automobile when the sliding roof is opened.

6 Claims, 1 Drawing Sheet

WIND DEFLECTOR FOR SLIDING ROOFS OF AUTOMOBILES

BACKGROUND OF THE INVENTION

This invention relates to a wind deflector for sliding roofs of automobiles, comprising a wind deflector plate situate at the forward edge of a roof opening, which plate is arranged to project above the upper roof surface and be inclined upwardly and outwardly away from the roof opening in the direction opposite to the automobile's direction of forward travel and is adapted on its upper side to generate air drag.

The invention is applicable both to those wind deflector plates which are fixed rigidly to the forward roof opening edge and also to those which are pivotally mounted in the vincinity of the forward edge of the roof opening and are constructed to be lowered below the closed sliding roof.

Wind deflectors are designed to deflect away from above the roof opening the air flow above a travelling automobile when the sliding roof is open, so that, by generating an air flow above the roof opening compared to the relatively stationary ambient air in the interior of the automobile, an air movement is produced which is oriented from the interior of the vehicle outwards and thus provides effective ventilation of the passenger space through fresh air flowing into the automobile via ventilation openings. A disadvantage of such wind deflectors arise, however, from the breakaway of the deflected air flow at the rear edge of those wind deflector plates which project more or less steeply beyond the roof surface. Because of this flow breakaway, turbulence is produced at the rear edge of the wind deflector plate, causing annoying wind noise and unpleasant vibrations in the interior of the vehicle, especially during high speed travel.

These disadvantages of wind deflectors are generally well known and so far it has not been possible satisfactorily to overcome them.

In one known wind deflector (DE-PS 23 39 680), the wind deflector has an aerofoil section with its cross-sectional area increasing in the flow direction. The thus shaped wind deflector possesses only a small angle of incidence and is disposed recessed in the roof opening. By this means air drag is intended to be generated on its upper face and thereby produce a quiet flow of wind around the deflector. The disadvantage of this known wind deflector arises from its thickened cross-section which, in the case of pivoting-in wind deflectors, requires a considerable accommodation space, which amongst other things increases the overall depth of the sliding roof construction and thereby reduces the headroom in the interior of the vehicle.

In another known wind deflector (DE-Gm 81 31 939), the wind deflector is equipped, in order to achieve an under-flow, with an upwardly oriented slit aperture extending transversely of the automobile and located substantially outside of the roof contour when the deflector is raised. By means of this slit opening, an under-flow is intended to be produced, which leads to a ventilation of the dead space behind the wind deflector, so that the suction in this region is reduced. This known wind deflector also has a relatively thickened cross-section, so that the aforementioned disadvantages again arise.

Accordingly, the present invention seeks to provide a wind deflector which, in spite of its construction as a relatively thin and thus space-saving leaf profile, generates effective drag on its upper face and thus produced a considerable reduction in wind noise and vibration.

SUMMARY OF THE INVENTION

This is achieved according to the present invention in that the wind deflector plate is furnished, on its upper surface, at least in the region of its rear edge with a brush-like coating.

By means of this brush-like coating, the air flow arriving at the wind deflector is disturbed and is slowed down in its boundary layer region to such an extent that a substantial reduction in noise and vibration takes place. Test runs carried out with a wind deflector of this invention installed in a private car have demonstrated a measurably and also noticeably better result compared with a wind deflector of the same construction but without the brush-like coating.

Preferably, the entire outer surface of the wind deflector plate is furnished with the brush-like coating. This gives optimum results in respect of noise and vibration reduction.

The brush-like coating can be affixed in position by laminating or gluing it using a coating support onto the upper face of the wind deflector plate.

It is, however, especially advantageous if the brush-like coating consists of strands of plastics fibres applied by electrostatic deposition onto the outer surface of the wind deflector plate. The electrostatic fibre deposition method is especially easy to carry out and leads to a dense firmly adhering and contour-correct brush-like coating.

The length of the strands of synthetic fibres are advantageously between approximately 1 and 2 mm. Synthetic fibre strands of this length provide on the one hand sufficient drag in the flow boundary layer and on the other hand remain in their correct orientation approximately perpendicular to the surface of the wind deflector even at high vehicle speeds.

The brush-like coating can be constructed as a continuous surface or be divided into a plurality of areas.

BRIEF DESCRIPTION OF THE DRAWINGS

Further details of the invention are explained below with reference to the drawings illustrating, by way of example, three embodiments thereof. In the drawings.

DESCRIPTION OF PREFERRED EMBODIMENTS

Figure 1:
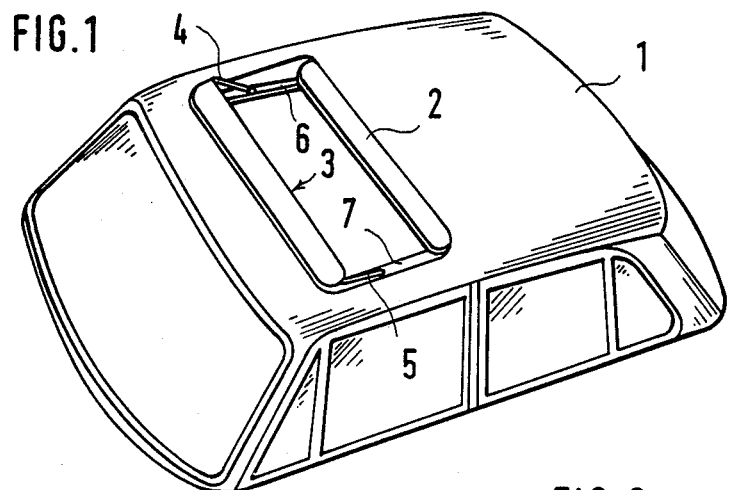
FIG. 1 is a perspective view of an automobile roof equipped with a sliding roof and a wind deflector of the present invention.
Figure 2:
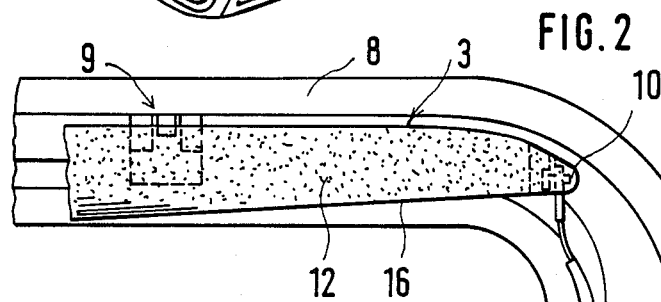
FIG. 2 is a cutaway plan view of the right, front corner of the sliding roof frame of FIG. 1 showing the wind deflector and the cut-away, forward corner of the sliding roof.

In FIGS. 1 and 2 the wind deflector of this invention is illustrated by the example of a pivotal deflector. For this purpose, there are shown schematically in FIG. 1 the fixed automobile roof 1, the sliding roof 2, the wind deflector plate 3, the lifting arms 4 and 5 which pivot the wind deflector plate and the two longitudinal members 6 and 7 of the roof frame.

As can be seen from FIG. 2, the wind deflector plate 3 is pivotally attached to the forward roof frame transverse member 8 by hinge assemblies 9, of which only one can be seen in FIG. 2. The lifting arm 4 is articulated to the outer end of the wind deflector plate 3 by a pivot pin 10, fixed to the wind deflector plate 3. For this purpose, the lifting arm possesses an elongated hole (not shown) for receiving the pivot pin 10, this hole providing the necessary compensation for the pivoting travel when the lifting arm 4 is pivoted. At its other end, the lifting arm 4 is pivotally journalled on a bearing block 11, mounted on the longitudinal component 6 of the roof frame.

For pivoting in the outwardly pivoted lifting arm 4, the front edge of the sliding roof 2 or a component connected with the sliding roof runs on the upper surface of the lifting arm 4, causing this arm to be pivoted downwards against the action of a spring (not shown). Consequently, the wind deflector plate 3 is simultaneously rotated downwards by the articulated attachment of the lifting arm 4 to the wind deflector plate 3 so that the sliding roof 2 can be moved over the wind deflector plate 3 forwards into its closed position. During opening of the sliding roof 2, the reverse sequence of movement takes place.

The construction of a pivotal wind deflector for sliding roofs so far described is itself known (DE-Gm 78 25 737). The construction of the wind deflector according to this invention will now be explained in more detail.

In the embodiment shown in FIG. 2, the wind deflector plate is furnished, on its entire external surface, with a brush-like coating 12. In this case, the coating can be applied by electrostatic fibre deposition. For applying such a coating, the whole external surface of the wind deflector plate 3 is furnished with a relatively thin, initially liquid, coating of a rapid hardening adhesive. For fixing a plurality of short, elastic synthetic fibre strands, the wind deflector plate 3 is passed through an apparatus, in which it is subjected to a strong electric field oriented approximately perpendicular to the wind deflector plate, for the purpose of electrostatic fibre deposition. The electrostatically charged fibres, for example polyamide fibres, are blown into the electric field. These fibres orient themselves along the lines of the electric field, are attracted by the wind deflector plate, remain stuck in the adhesive coating whilst standing approximately perpendicular, and are fixed in this position by hardening the adhesive on the outer surface of the wind deflector plate. This electrostatic fibre deposition method is itself known.

Figure 3:
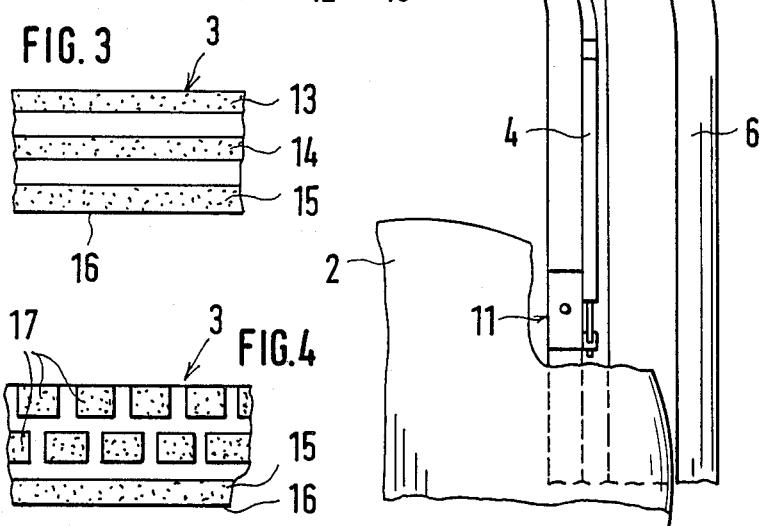
FIG. 3 is a cut-away plan view of a wind deflector having a different form of brush-like coating used in the invention.

In the embodiment shown in FIG. 3, the brush-like coating is applied in the form of three parallel strips 13, 14 and 15, spaced apart from one another, or which the strip 15 is situate at the rear edge 16 of the wind deflector plate 3.

Figure 4:
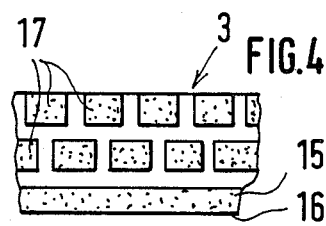
FIG. 4 is a plan view similar to that of FIG. 3 but of a further embodiment of the brush-like coating used in the present invention.

In the embodiment according to FIG. 4, a strip-shaped coating 15 is again present at the rear edge 16 of the wind deflector plate 3. On the remaining external surface of the wind deflector plate 3, individual coating region 17 are applied at intervals, the arrangement of these regions advantageously being staggered.

The brush-like coating applied by electrostatic fibre deposition and constituted of synthetic fibre strands of approximately 1 to 2 mm in length, ensures that, when the wind deflector pltat 3 is raised, the air flow striking the wind deflector plate during travel is greatly retarded in the boundary layer zone, with the result that the abrupt formation of a turbulent zone immediately adjacent the rear edge 16 of the wind deflector plate 3 is considerably disrupted. Measurements have shown that the noise level in the interior of an automobile when the sliding roof 2 is opened is considerably reduced if, instead of an uncoated wind deflector plate, a plate coated according to this invention is used. These measurements are given in the following Table. The measurements were carried out for five different speeds, one measuring point being located on the right-hand forward seat (R) and a further measuring point being located in the rear region of the automobile interior (H). The readings were recorded in dB (A). For a speed of v=180 km/h, no measurement is available for the rear measuring point in the case of the coated construction of the wind deflector plate. As the Table shows, at all speeds considerably reductions in noise were attained when the wind deflector plate furnished with a brush-like coating was used. The wind deflector plate used here was electrostatically coated on its entire outer surface corresponding to the embodiment illustrated in FIG. 2, with synthetic fibre strands approximately 2 mm long. The angle of incidence of the wind deflector plate 3 to the horizontal was 42°.

TABLE

| Speed v km/h | Noise Level with uncoated plate dB (A) | | Noise Level with coated plate dB (A) | |
|---|---|---|---|---|
| | R | H | R | H |
| 80 | 78 | 84 | 73 | 83 |
| 100 | 82 | 89 | 79 | 86 |
| 120 | 88 | 94 | 86 | 89 |
| 150 | 97.5 | 100 | 93 | 96 |
| 180 | 103.5 | 105.5 | 98.5 | — |

We claim:

1. In a roof for an automobile having a roof opening, a sliding roof, and a wind deflector for the sliding roof, wherein the wind deflector comprises a wind deflector plate pivotally attached at a forward edge of the roof opening, which plate has a rear edge arranged to project above an upper surface of the roof such that the deflector plate is inclined upwardly and outwardly away from the roof opening in a direction opposite to the automobile's direction of forward travel and is adapted on its upper side to generate air flow drag, the improvement which comprises:

an elongated first strip of brush-like coating material extending along an upper surface of the deflector plate adjacent the rear edge; and a plurality of second strips of brush-like coating material applied to separate, discreet areas of the upper surface of the deflector plate, the brush-like coating material comprising a plurality of synthetic fibre strands adhesively bonded in a substantially perpendicular orientation.

2. A roof according to claim 1 wherein the first and second strips of the brush-like coating consists of synthetic fibre strands applied by electrostatic deposition onto the outer surface of the wind deflector plate.

3. A roof according to claim 2, wherein the synthetic fibre strands are between approximately 1 and 2 mm in length.

4. A roof according to claim 1 wherein the plurality of second strips comprise a pair of elongated strips of brush-like coating material extending substantially across the width of the deflector plate generally parallel to the elongated first strip.

5. A roof according to claim 4 wherein each of the pair of elongated second strips has a plurality of open spaces so as to define discreet areas covered by the brush-like coating material.

6. In a roof for an automobile having a roof opening, a sliding roof, and a wind deflector for the sliding roof, wherein the wind deflector comprises a wind deflector plate pivotally attached at a forward edge of the roof opening, which plate has a rear edge arranged to project above an upper surface of the roof such that the deflector plate is inclined upwardly and outwardly away from the roof opening in a direction opposite the automobile's direction of forward travel and is adapted on its upper side to generate air flow drag, the improvement which comprises:

a brush-like coating material extending over an entire upper surface of the deflector plate, the brush-like coating material comprising a plurality of synthetic fibre strands adhesively bonded in a substantially perpendicular orientation.

* * * * *